Aug. 1, 1950
R. LEWON ET AL
2,517,001
MOLDING APPARATUS
Filed Oct. 31, 1947
2 Sheets-Sheet 1
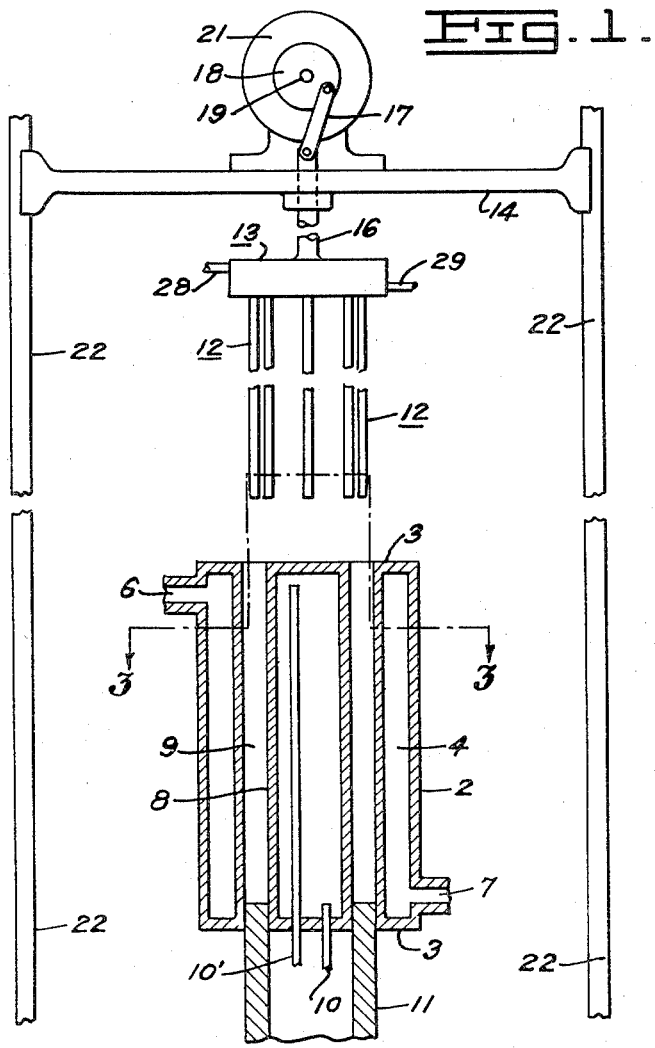
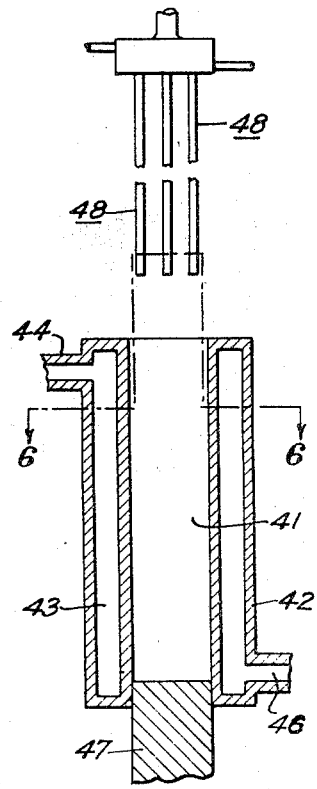
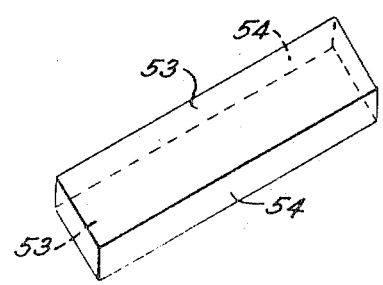
INVENTORS
RUBIN LEWON
GEORGE P. LECHICH
BY
Charles M. Fryer
ATTORNEY

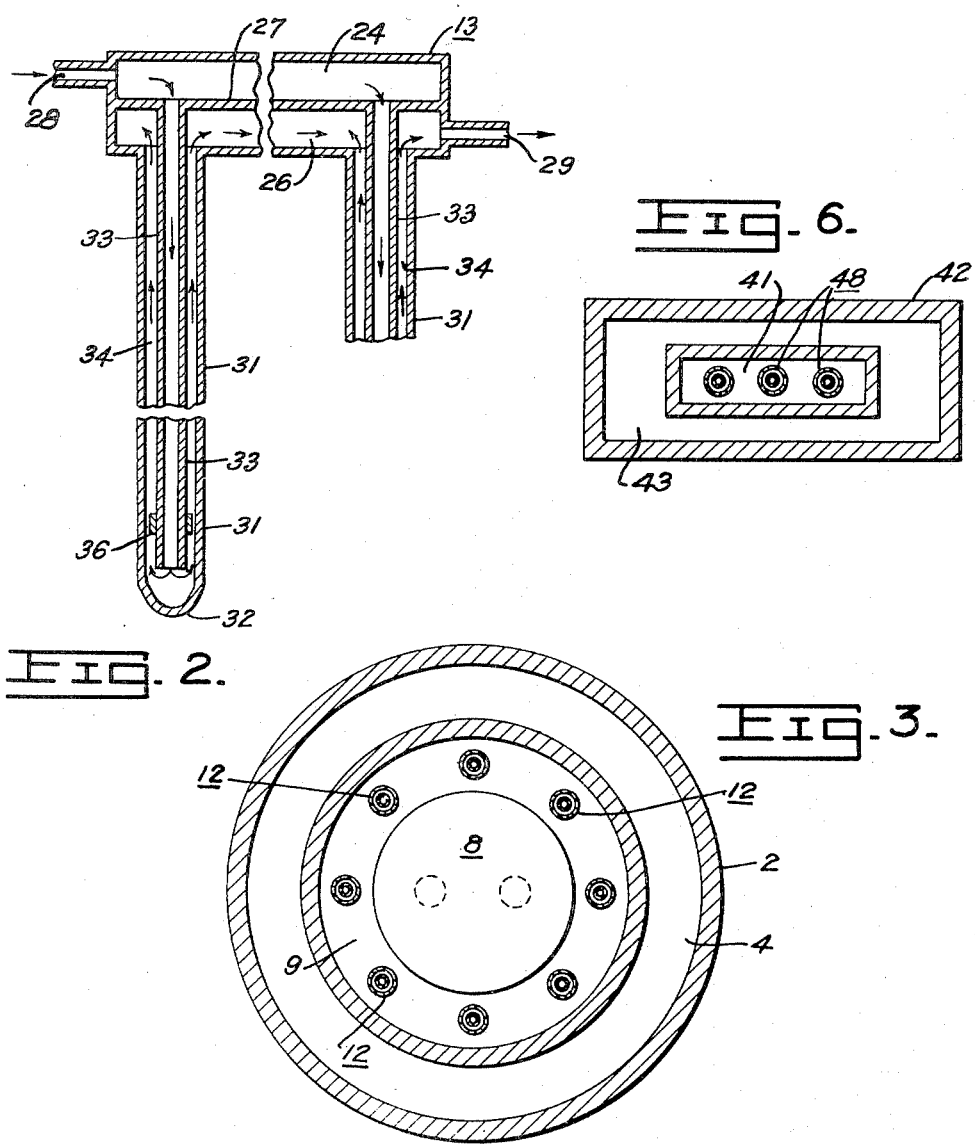

Patented Aug. 1, 1950

2,517,001

UNITED STATES PATENT OFFICE 2,517,001

MOLDING APPARATUS

Rubin Lewon, Berkeley, and George P. Lechich, Menlo Park, Calif., assignors to The Paraffine Companies, Inc., San Francisco, Calif., a corporation of Delaware Application October 31, 1947, Serial No. 783,408

3 Claims. (Cl. 25—41)

Our invention relates to molding apparatus, and more particularly to such apparatus adapted for the molding of light weight insulating material from an aqueous slurry of the same, such as magnesia insulation or insulation shaped from a slurry containing reactable calcareous and silicious materials.

With respect to insulating material of the character described, a desirable process for the production of shaped light weight insulating blocks or units is to pour the slurry into a mold, and apply heat both to the mold and directly to the slurry in the mold to heat the slurry rapidly and thereby enhance setting of the slurry to a firm self-supporting mass in a relatively short time, after which the set mass is ejected from the mold in self-supporting form. In the case of magnesia insulation, the set mass is then dried, while in the case of the reactable calcareous-silicious insulation, it is indurated and then dried.

Both the magnesia slurry and the calcareous-silicious slurry usually contain a suitable reenforcing fiber, preferably asbestos, but which may be any other reenforcing fiber which is preferably non-inflammable. To enhance the strength of the final product, it is desirable to arrange the fiber in the slurry while it is in the mold, so that the fiber will be oriented longitudinally in the general direction of the axis of the product.

Our invention has as its objects, among others, the provision in molding apparatus for material of the character described, of means for directly and quickly heating the slurry in the mold, which at the same time provides a means for orienting the fiber in the slurry, and which is of relatively simple and economical construction. Other objects of our invention will become apparent from a perusal of the following description thereof.

In general, our molding apparatus comprises a mold having a cavity which may be tubular in form for the production of a tubular object or which may be of any form, such as rectangular in cross-section to produce a flat slab. Means is associated with the mold for heating the same to maintain the slurry hot in the mold. For direct heating of the slurry in the mold, we provide a plurality of heating elements in the form of fingers which are highly heated, preferably by steam, and mounted for movement relative to the mold so that they can be inserted directly into the slurry in the mold cavity to heat it up rapidly when the slurry is first poured into the mold. As these heating elements are inserted into the mold, they are given a rapid back and forth or reciprocating movement which have the effect of orienting or straightening out the reenforcing fiber generally longitudinally of the axis of the product to enhance the strength thereof.

Referring to the drawings:

Fig. 1 is a schematic fragmentary, vertical sectional elevation of a form of tubular mold and associated frame structure for producing a tubular mass of material.

Fig. 2 is a schematic, enlarged vertical section of the mold fingers or heating elements, illustrating the mode of applying heat thereto for heating the slurry after it is poured into the mold; parts being broken away to shorten the view.

Fig. 3 is an enlarged horizontal section taken in planes indicated by line 3—3 in Fig. 1.

Fig. 4 is a perspective view of the tubular mass resulting from the mold of Figs. 1 through 3.

Fig. 5 is a view similar to Fig. 1 but omitting the frame structure, of a mold adapted to shape a flat slab.

Fig. 6 is an enlarged horizontal section taken in planes indicated by line 6—6 in Fig. 5.

Fig. 7 is a perspective view of the resultant flat slab shaped by the mold of Figs. 5 and 6.

With reference to Figs. 1 through 3, a form of mold for producing a tubular or pipe shaped mass comprises a stationary cylinder 2 having closed ends 3, and containing a circumferential space 4 which provides a jacket for circulation of a heating medium such as hot water or steam, and which, during setting of a mass in the mold, insures thorough application of heat to the outside surface of such mass. This heating medium is introduced into jacket 4 through inlet pipe connection 7, and it is conducted from the jacket through outlet pipe connection 6. Any suitable heating and circulating means may be provided for causing heating of the heating medium, and flow thereof through jacket 4.

Located within cylinder 2 is a stationary cylindrically shaped, hollow mandrel 8 which forms in cooperation with the inner wall of cylinder 2, an elongated and tubular space or mold cavity 9, into which the slurry may be poured. To insure thorough application of heat to the inside surface of the mass in the mold, the heating medium is also circulated through the inside of mandrel 8. This may be readily accomplished by means of a heating medium inlet pipe 10, and an over-flow pipe 10' which terminates close to the upper end of the mold. Positioned in the lower end of space 9 is a tubular-like ram or ejector 11, which when the mass in space 9 has been set to a firm self-supporting cake, is moved upwardly by any suitable means (not shown) to eject the set mass endwise from the mold, and is moved downwardly to its lowermost position as the mold is filled with slurry.

As previously mentioned, the slurry poured into the mold usually contains a suitable reenforcing fiber, preferably asbestos, but which may be any other reenforcing fiber, preferably non-inflammable, such as other mineral fibers, glass fiber or metallic fiber. To enhance the strength of the final product, it is desirable that these fibers be arranged or oriented longitudinally in the general direction of the axis of the product; and for this purpose, there is preferably provided in association with the mold, a group of circumferentially arranged rods or fingers 12, which are adapted to be inserted into the mold space 9. These fingers are connected to a suitable support or cross-head 13 which is mounted for slidable reciprocating movement on carriage 14 by means of rod member 16 in turn pivotally connected to connecting rod 17 which is pivotally connected to crank disc 18 mounted on a motor shaft 19 of a suitable electric motor 21 in turn fixedly supported on carriage 14.

Carriage 14 is slidably mounted on tracks 22 of a suitable frame-work and may be moved longitudinally of the mold by any suitable means (not shown) for longitudinal movement of fingers 12 either into or out of the mold. When the mold is to be filled the upper end of ram 11 is preferably positioned adjacent the upper end of the mold; and as the mold is being filled with slurry the ram is moved downwardly to allow the mold to become completely filled with slurry. Simultaneously with downward movement of the ram, the fingers are moved to follow the ram, longitudinally downwardly into the slurry in space 9 until the upper end of the ram is adjacent the bottom of the mold with the lower ends of such fingers in close proximity to the ram 11. At the same time that the fingers are moved longitudinally into the mold as it is being filled with slurry, they are also given a limited but rapid back and forth movement by the described reciprocable mounting of cross-head 13. As a result, the fibers are more or less oriented or straightened out in the slurry in the mold.

Shortly after the mold is completely filled with slurry, the fingers 12 are moved out of the mold to a position where they are out of the way when ram 11 is moved upwardly to eject the pre-set mass from the mold. It is to be understood that the fingers are only brought into action for a relatively short time when the slurry is first poured into the mold.

As previously explained, the fingers 12 are utilized as the elements for applying heat directly to the slurry in the mold, and thus heat it up rapidly. For this purpose, as can be observed from Fig. 2, cross-head support 13 is hollow and is divided into an inlet heating medium chamber or compartment 24 and an outlet or exhaust heating medium chamber 26, by means of partition wall 27; inlet chamber 24 having inlet steam pipe connection 28 which may be connected to any suitable source of heating medium, preferably steam, by flexible piping (not shown), and exhaust chamber 26 having similar exhaust steam pipe connection 29.

Each finger or heating element is formed of spaced nested tubes comprising an outer pipe 31 open at its inner end to outlet heating medium chamber 26 but which is closed at its outer or mold end 32, and also of an inner pipe 33 open at its inner end to inlet heating medium chamber 24 and which extends in close proximity to the closed end 32 of pipe 31, but which is open at its mold end. Thus, the heating medium introduced into chamber 24 can flow through the inner pipe 33 and out through the annular space 34 between the inner and the outer pipes, and into exhaust chamber 26 from which the heating medium is discharged, as is indicated by the direction arrows.

The described arrangement of the nested tubes, insures that when the heating elements are inserted into the slurry, the heat will be applied to the slurry at all portions thereof in contact with such elements. It is desirable to bring the slurry of the character described to a highly heated state as quickly as possible and for a short time. To accomplish this, steam is preferably employed as the heating medium, and is introduced into the heating elements 12 at superatmospheric pressure so as to heat these elements quickly to above the boiling temperature of water. To minimize drop of pressure at the lower or mold ends of the heating elements, and hence minimize drop in temperature, a steam throttling sleeve 36 is preferably provided around the inner pipe 33 adjacent its lower end and which provides only slight clearance between the periphery of the sleeve and the inner surface of pipe 31. Such clearance is in the order of 0.001 to 0.010 of an inch depending upon the size of the equipment and the pressure at which the steam is introduced. Also to impart heat rapidly to the slurry, the heating elements are preferably formed of a metal of high heat conductivity such as aluminum, brass or copper. In this connection, the reciprocating motion imparted to the heating elements as the mold is being filled with slurry cooperates in imparting heat rapidly to the slurry because the resultant agitation aids in heat transfer.

The mold of Figs. 5 and 6 is essentially the same as that previously described, and the heating elements or fingers thereof are of the same construction and are mounted for movement in the same way as those for the tubular mold. However, the mold of Figs. 5 and 6 is designed for the shaping of a narrow flat slab of insulating material, and therefore does not contain a stationary mandrel within elongated cavity space 41 in the mold. Such cavity is surrounded by stationary, rectangularly shaped (in cross-section) mold body 42 having heating jacket 43 which communicates with inlet pipe connection 46 and outlet pipe connection 44. Ejector or ram 47 is provided to accomplish the same result as ram 11; and fingers 48 serve the same function as fingers 12.

With respect to tubular product illustrated by Fig. 4, it is to be noted that the mold produces inner arcuate surface 51 and outer arcuate surface 52 which are both mold smooth and true to shape. As a result, such product will provide a pipe covering after it has been finally treated, by cutting it longitudinally in half, and fitting the halves around a pipe of appropriate size. The flat slab of Fig. 7 has mold smooth opposite side surfaces 53 and side edge surfaces 54 and may be used for so-called "block" insulation.

From the preceding description, it is seen that the mold of our invention embodies heating elements of relatively simple and economical construction which not only perform the function of rapidly heating the slurry directly in the mold, but they also provide a means whereby the fiber in the slurry may be oriented generally in one direction to increase the strength of the final product. Although such heating elements are preferably of the construction described because such construction enables convenient use of steam as the heating medium, the fiber orienting fingers may be heated by any other suitable means such as electrical means.

We claim:

1. In molding apparatus of the character described in which a mold cavity is provided adapted to hold a slurry containing reenforcing fiber; mechanism for both heating said slurry and simultaneously orienting said fiber comprising a carriage mounted for movement in one general direction toward and away from said cavity, a plurality of heating elements adapted to be inserted directly into the slurry in said cavity to heat the same, a hollow support for said heating elements on said carriage, and means connected between said heating element support and said carriage for simultaneously imparting a back and forth reciprocating movement to said support as it is moved toward said mold cavity by said carriage to reciprocate said heating elements and thereby effect orientation of said fiber by said heating elements; said heating element support having an inlet heating fluid chamber and an outlet chamber for said fluid; and each of said heating elements comprising an inner tube connected to the inlet chamber and open at its end adjacent the mold, and an outer tube spaced from said inner tube and connected to the outlet chamber, said outer tube being closed at its mold end.

2. In molding apparatus of the character described in which a mold cavity is provided adapted to hold a slurry containing reenforcing fiber; mechanism for both heating said slurry and simultaneously orienting said fiber comprising a carriage mounted for movement in one general direction toward and away from said cavity, a plurality of heating elements adapted to be inserted directly into the slurry in said cavity to heat the same, a hollow support for said heating elements on said carriage, and means connected between said heating element support and said carriage for simultaneously imparting a back and forth reciprocating movement to said support as it is moved toward said mold cavity by said carriage to reciprocate said heating elements and thereby effect orientation of said fiber by said heating elements; said heating element support having an inlet steam chamber and an exhaust steam chamber; and each of said heating elements comprising an inner tube connected to the inlet chamber and open at its end adjacent the mold, and an outer tube spaced from said inner tube and connected to the exhaust chamber, said outer tube being closed at its mold end; and a steam throttling member between said tubes adjacent the mold end of the inner tube.

3. In molding apparatus of the character described in which a mold cavity is provided adapted to hold a slurry containing reenforcing fiber; mechanism for both heating said slurry and simultaneously orienting said fiber comprising a carriage mounted for movement in one general direction toward and away from said cavity, a plurality of heating elements adapted to be inserted directly into the slurry in said cavity to heat the same, a hollow support for said heating elements on said carriage, and means connected between said heating element support and said carriage for simultaneously imparting a back and forth reciprocating movement to said support as it is moved toward said mold cavity by said carriage to reciprocate said heating elements and thereby effect orientation of said fiber by said heating elements; said heating element support having a horizontal partition wall dividing the same into an upper inlet heating fluid chamber and into a lower outlet chamber for said fluid; and each of said heating elements comprising an inner tube connected to the upper inlet chamber and open at its end adjacent the mold, and an outer tube spaced from said inner tube and connected to the lower outlet chamber, said outer tube being closed at its mold end.

RUBIN LEWON.
GEORGE P. LECHICH.

REFERENCES CITED

The following references are of record in the file of this patent:

UNITED STATES PATENTS

| Number | Name | Date |
|---|---|---|
| 476,799 | Johnston | June 14, 1892 |
| 695,748 | Martin et al. | Mar. 18, 1902 |
| 958,156 | McMahon | May 17, 1910 |
| 965,002 | Pauly | July 19, 1910 |
| 1,551,313 | Kocsis et al. | Aug. 25, 1925 |
| 1,661,414 | Dunn | Mar. 6, 1928 |
| 2,310,830 | Blair et al. | Feb. 9, 1943 |
| 2,432,981 | Abrahams et al. | Dec. 23, 1947 |